United States Patent [19]
Kisaka

[11] Patent Number: 5,608,588
[45] Date of Patent: Mar. 4, 1997

[54] METHOD FOR CONTROLLING DIGITAL CLOSED SERVO LOOP SYSTEM AND DISK STORAGE APPARATUS USING THE SYSTEM

[75] Inventor: Masashi Kisaka, Yokohama, Japan

[73] Assignee: International Business Machines Corporation, Armonk, N.Y.

[21] Appl. No.: 392,271

[22] Filed: Feb. 21, 1995

Related U.S. Application Data

[63] Continuation of Ser. No. 68,818, May 27, 1993, abandoned.

[30] Foreign Application Priority Data

May 28, 1992 [JP] Japan ..................... 4-137157

[51] Int. Cl.$^6$ .................................. G11B 5/596
[52] U.S. Cl. ............... 360/78.04; 318/677; 318/592
[58] Field of Search ................... 360/75, 77.05, 360/77.07, 77.08, 77.11, 78.04, 77.13; 318/592, 599, 677

[56] References Cited

U.S. PATENT DOCUMENTS

| | | | |
|---|---|---|---|
| 4,931,889 | 6/1990 | Osafune | 360/78.06 X |
| 5,105,318 | 4/1992 | Tsuneta et al. | 360/78.04 X |
| 5,146,440 | 9/1992 | Yamaguchi et al. | 360/78.09 X |
| 5,150,266 | 9/1992 | Albert | 360/78.07 X |
| 5,177,652 | 1/1993 | Yamaguchi et al. | 360/77.02 X |
| 5,231,550 | 7/1993 | Hashimoto | 360/75 X |

FOREIGN PATENT DOCUMENTS

| | | | |
|---|---|---|---|
| 6489088 | 4/1989 | Japan . | |
| 2011654 | 7/1979 | United Kingdom | 360/78.09 |

OTHER PUBLICATIONS

Pennington et al. "Digital Sector Servo System" IBM TDB vol. 22, No. 6, Nov. 1979 pp. 2476–2481.
Franklin et al. *Digital Control of Dynamic Systems* 1990 pp. 653–656.

*Primary Examiner*—W. C. Kim
*Assistant Examiner*—James T. Wilson
*Attorney, Agent, or Firm*—Matthew J. Bussan; Roy W. Truelson; Derek P. Martin

[57] ABSTRACT

A controlled variable is detected at each predetermined timing by a detecting section 2, and the controlled variable is compared with a target value by a comparator 3 to obtain a deviation. A manipulated variable is calculated, based on the deviation, by a compensating section 4, and a height H corresponding to the manipulated variable is calculated by a controlling section 5. A manipulated pulse having the height H and a predetermined width W is provided to a controlled system 6 by the controlling section 5.

4 Claims, 5 Drawing Sheets

МЕТHOD FOR CONTROLLING DIGITAL CLOSED SERVO LOOP SYSTEM AND DISK STORAGE APPARATUS USING THE SYSTEM

This application is a continuation of application Ser. No. 08/068,818, filed May 27, 1993 now abandoned.

FIELD OF THE INVENTION

The present invention relates to a method for controlling a digital closed servo loop system, the system, and a disk storage apparatus using the system.

BACKGROUND OF THE INVENTION

In a disk storage apparatus, the position of a read/write head, the number of revolutions of a spindle motor which rotates a disk, and the like are controlled by means of a digital closed-loop by an internal digital microcomputer. As an example, the position control of the read/write head is described in the following. A well-known positioning mechanism of a magnetic disk apparatus is such that a voice coil motor is used as the driving source of a head. A conventional example of controlling the voice coil motor by means of a pulse is disclosed in Japanese PUPA 64-89088. In the conventional example, a manipulated pulse modulated by means of pulse width modulation (PWM) is used to operate the voice coil motor. However, since there is a limit in a variable pulse width under PWM control, it is difficult to perform adaptive control for maintaining optimum performance at all times, regardless of such variable parameters in a disk storage apparatus as output characteristics of a voice coil motor, inertial torque of a head arm, and force given to the head arm by a flexible cable attached to the head arm. Further, there is also a limit in the reduction of power consumption. In the following, the reason why the adaptive control is conventionally impossible is described in detail.

Consider the equation of motion of a read/write head in discrete time. That is, if it is assumed that the position of a head at a time n+1 is $y_{n+1}$ then $$y_{n+1}=a_1 y_n + a_2 y_{n-1} + b_1 u_n + b_2 u_{n-1} \quad (1)$$

where $u_n$ is a current which flows through a voice coil, and $a_1$, $a_2$, $b_1$, $b_2$, and $b_3$ are coefficients which depend on variable parameters.
In expression (1), if $$u_n = \frac{-1}{b1} (a_1 y_n + a_2 y_{n-1} + b_2 u_{n-1} + b_3 u_{n-2})$$

Then, $y_{n+1}$ at a time n+1 will vanish.
Now consider whether there is stable input which causes $y_{n+1}$ to vanish.

Expression (1) can be written by z transformation as follows (see "Digital Control" Katsuhisa Furuta, Coronasha, 1989, p.32):

$$zY = a_1 Y + a_2 z^{-1} Y + b_1 u + b_2 z^{-1} u + b_3 z^{-2} u$$

It follows that:

$$Y = \frac{b_1 + b_2 z^{-1} + b_3 z^{-2}}{z - a_1 - a_2 z^{-1}} u \quad (2)$$

Now, Y=0 is assumed. That is, the value (zero) of z is determined so that the numerator becomes zero. If Y=0, the following expression can be obtained from expression (2):

$$b_1 z^2 + b_2 z + b_3 = 0 \quad (3)$$

However, z which satisfies expression (3), that is, zero, is not necessarily within a unit circle in complex space, and therefore it is impossible to perform adaptive control for maintaining optimum control at all times, regardless of variable parameters (see opus citatum, p.218).

SUMMARY OF THE INVENTION

Accordingly, an object of the present invention is to solve such problems as described above to provide a method for controlling a digital closed servo loop system which enable adaptive control and the system.

Another object of the present invention is to provide a disk storage apparatus which has adaptive control as well as reduced power consumption.

To attain such objects, a method of controlling a digital closed servo loop system according to the present invention comprises the steps of: detecting a controlled variable at each predetermined timing; calculating a deviation by comparing the controlled variable with a target value; calculating a manipulated variable based on the deviation; and generating a manipulated pulse having a height corresponding to the manipulated variable and a predetermined width to supply to the controlled system.

A digital closed servo loop system according to the present invention comprises: setting means for setting a target value; detecting means for detecting a controlled variable at each predetermined timing; comparing means for calculating a deviation by comparing the controlled variable detected by the detecting means with said target value; compensation means for calculating a manipulated variable based on the deviation obtained from the comparing means; and control means for outputting a manipulated pulse having a height corresponding to the manipulated variable calculated by the compensation means and a predetermined width to the controlled system.

A disk storage apparatus according to the present invention comprises: position detecting means for detecting the position of a head at each sampling of servo information; calculating means for calculating a current value according to a deviation obtained by comparing a position detected by the position detecting means with a predetermined position; and driving means for outputting a manipulated pulse having a height corresponding to the current value calculated by the calculating means and a predetermined width to a voice coil motor which drives the head.

In a method for controlling a digital closed-loop system according to the present invention, a controlled variable is detected at each predetermined timing, a deviation is calculated by comparing the controlled variable with a target value, a manipulated variable is calculated based on the deviation, and a manipulated pulse having a height corresponding to the manipulated variable and a predetermined width is supplied to the controlled system.

In a control system of a digital closed-loop system according to the present invention, a target value is set by setting means, a controlled variable is detected at each predetermined timing by detecting means, a deviation is calculated by comparing the controlled variable detected by the detecting means with the target value by means of comparison means, a manipulated variable is calculated, based on the deviation obtained from the comparison means, by compensation means, and a manipulated pulse having a height corresponding to the manipulated variable calculated by the compensation means and a predetermined width is outputted to the controlled system from control means.

In a disk storage apparatus according to the present invention, the position of a head is detected at each sampling of servo information by position detecting means, a current value is calculated by calculating means according to a deviation by comparing a position detected by the position detecting means with a predetermined position, and a manipulated pulse having a height corresponding to the current value calculated by the calculating means and a predetermined width is outputted, by driving means, to a voice coil motor for driving the head.

DETAILED DESCRIPTION OF THE PREFERRED EMBODIMENT

In the following, an embodiment of the present invention is described in detail by reference to the drawings.

Figure 1:
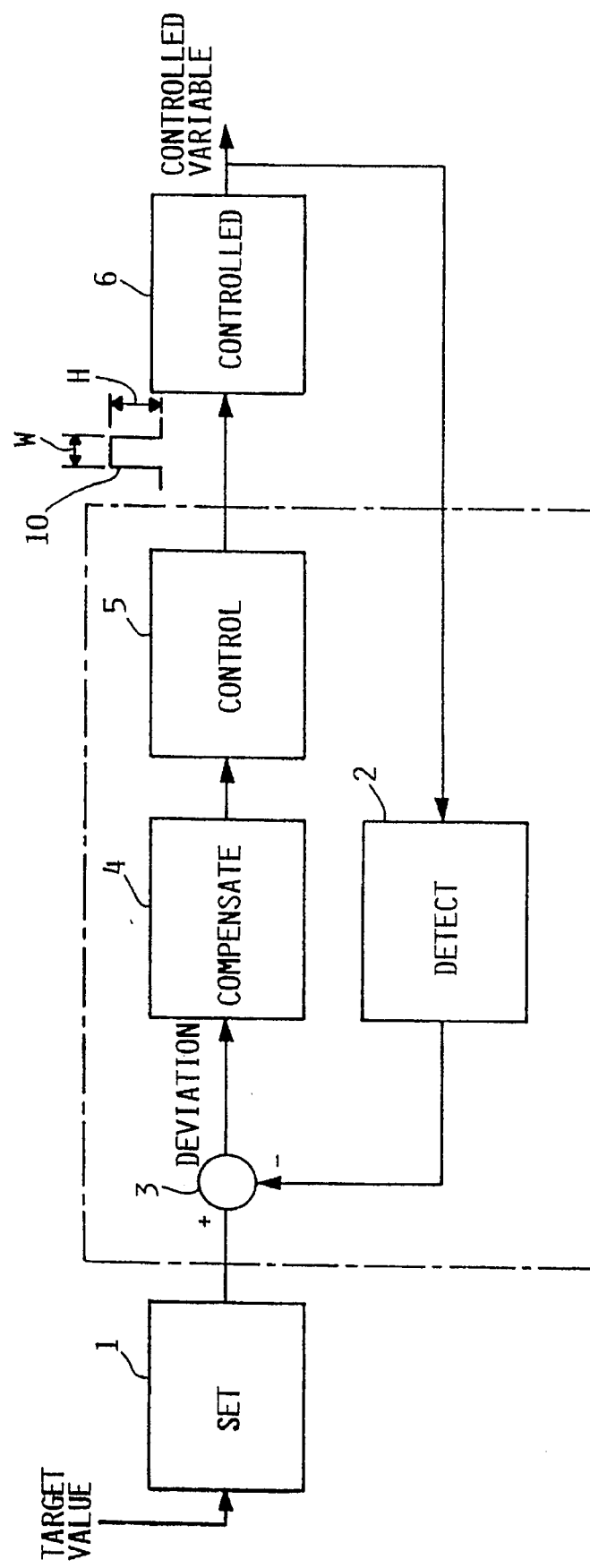
FIG. 1 is a block diagram showing an embodiment of a digital closed servo loop system according to the present invention.

FIG. 1 shows an embodiment of a digital closed servo loop system according to the present invention.

In FIG. 1, indicated by numeral 1 is a setting section as a setting means for setting a target value. Numeral 2 indicates a detecting section as a detecting means for detecting a controlled variable from controlled system 6. Numeral 3 indicates a comparator as a comparing means for comparing the target value set by setting section 1 with the controlled variable detected by detecting section 2 to obtain a deviation. Numeral 4 indicates a compensating section as a compensating means for generating a manipulated variable based on the deviation from comparator 3. Numeral 5 indicates a controlling section as a control means for calculating the height (manipulated variable) H of a pulse based on the manipulated variable from compensating section 4 to supply a manipulated pulse 10 having the height H and a predetermined width W to controlled system 6.

In the following, a method for controlling the system is described.

A controlled variable is detected, at each predetermined timing, by detecting section 2, and after the controlled variable is detected, the controlled variable is compared with a target value to obtain a deviation by means of comparator 3. Then, after the deviation is calculated, a manipulated variable is calculated, based on the deviation, by compensating section 4. Subsequently, manipulated pulse 10 having a height H corresponding to the manipulated variable and a predetermined width W is supplied, through controlling section 5, to controlled system 6.

Whether adaptive control is practicable or not is described based on the following example, and such description is omitted here.

Figure 2:
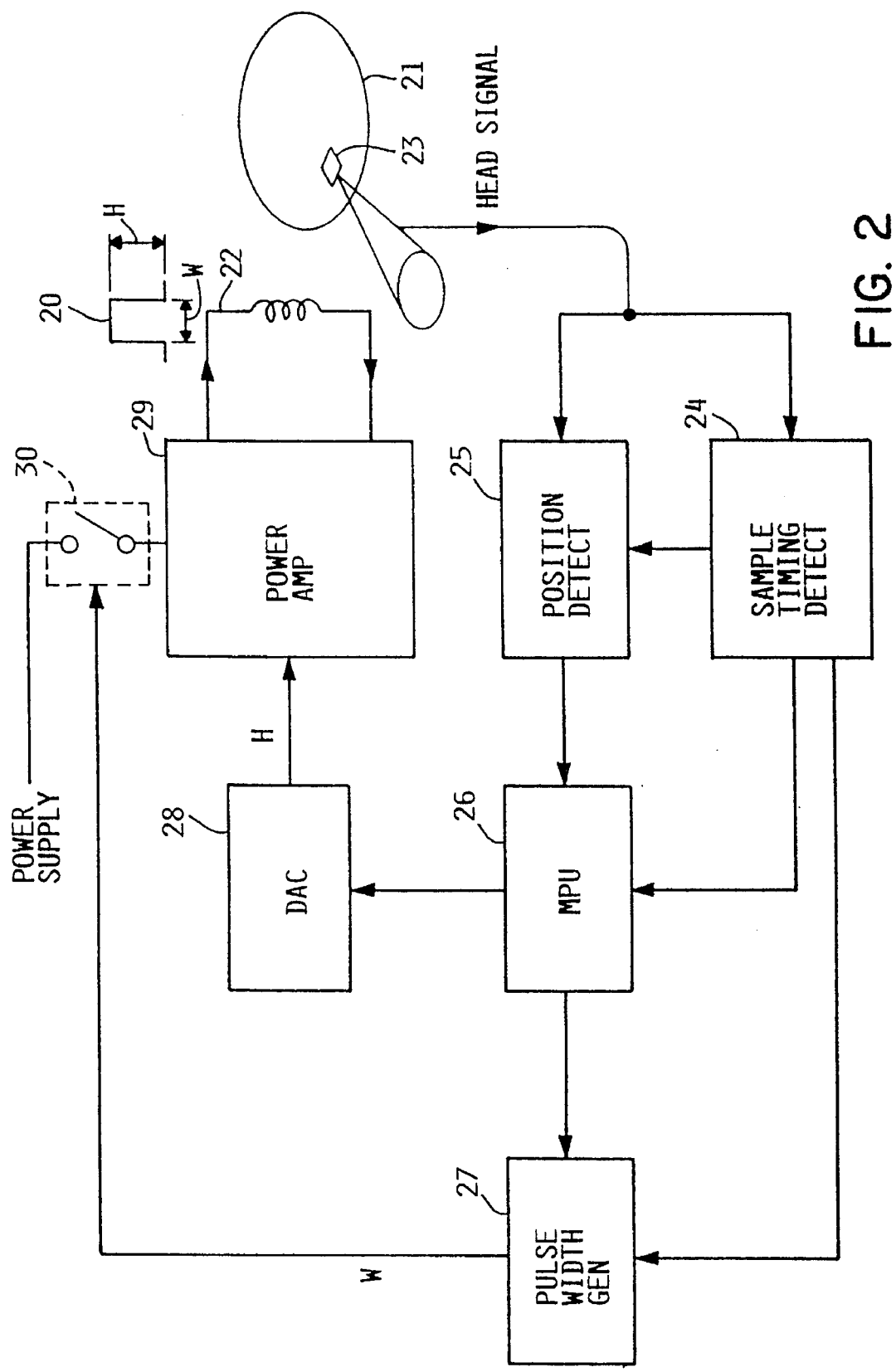
FIG. 2 is a block diagram showing an embodiment of a disk storage apparatus according to the present invention.

FIG. 2 shows an embodiment of a disk storage apparatus according to the present invention. This is an example of a hard disk drive and a concrete example of the above digital closed servo loop system.

In FIG. 2, indicated by numeral 21 is a hard disk which has more than one concentric circular track, each of which is composed of more than one sector with each sector having servo information filled and formed therein. Numeral 22 indicates a voice coil motor for driving head 23. Numeral 24 indicates a sample timing detecting circuit for detecting sample timing based on a head signal from head 23. Indicated by numeral 25 is a position detecting circuit as position detecting means for receiving a head signal from head 23 based on a signal from sample timing detecting circuit 24 and for detecting a head position from servo information. Numeral 26 indicates a microprocessor unit (MPU) as calculating means for generating an 8-bit digital value which determines the height H of pulse 20 based on a position error between the head position detected by position detecting circuit 25 and a target position and for switching the pulse to either high gain or low gain according to seeking or track following, respectively.

Indicated by numeral 27 is a pulse width generating circuit for setting a power supply time W (duty cycle width) based on the gain set by MPU 26, and for generating a pulse signal of a predetermined width corresponding to a low gain after a predetermined time since a signal from sample timing detecting circuit 24 arrived during a track following operation and for generating a pulse signal of a predetermined width corresponding to high gain during a seeking operation. That is, pulse width generating circuit 27 sets a narrower pulse width during the track following operation and a broader pulse width during the seeking operation. Numeral 28 indicates a digital-to-analog converter (DAC) for converting an 8-bit digital value according to the height H of a manipulated pulse from MPU 26 into an analog value to generate PAM-modulated, manipulated pulse 20.

Indicated by numeral 29 is a power amplifier for providing analog converted pulse 20 of the height H from DAC 28 to voice coil motor 22. DAC 28 and power amplifier 29 compose driving means. Numeral 30 indicates a switch for powering on/off power amplifier 29 by means of a pulse signal from pulse width generating circuit 27 to generate manipulated pulse 20 of a predetermined width W.

In the following, operations during head position control are described by reference to FIG. 3.

The gain of pulse width generating circuit 27, that is, the pulse signal width W, is switched to either high gain or low gain by MPU 26 according to the seeking or track following operation, that is, to either a broader width W during the seeking or a narrower width W during the track following operation. Next, when servo information written in the beginning of a sector is detected by sample timing detecting circuit 24 based on a head signal from head 23 (FIG. 3(a)) and positional information is obtained by position detecting circuit 25 in the beginning of the sector, an 8-bit digital value which determines the height H of manipulated pulse 20 is sent to DAC 28 by MPU 26 based on a position error between the obtained position information and a target position. Immediately after a time $\lambda T$ elapses since the beginning of the sector was detected, switch 30 is turned on by a pulse signal from pulse width generating circuit 27, and then immediately after a predetermined time $W=\alpha T$ (duty cycle) elapses, switch 30 is turned off. The time from turning on to turning off of switch 30 is equal to the pulse width of the pulse signal from pulse width generating circuit 27.

Figure 3:
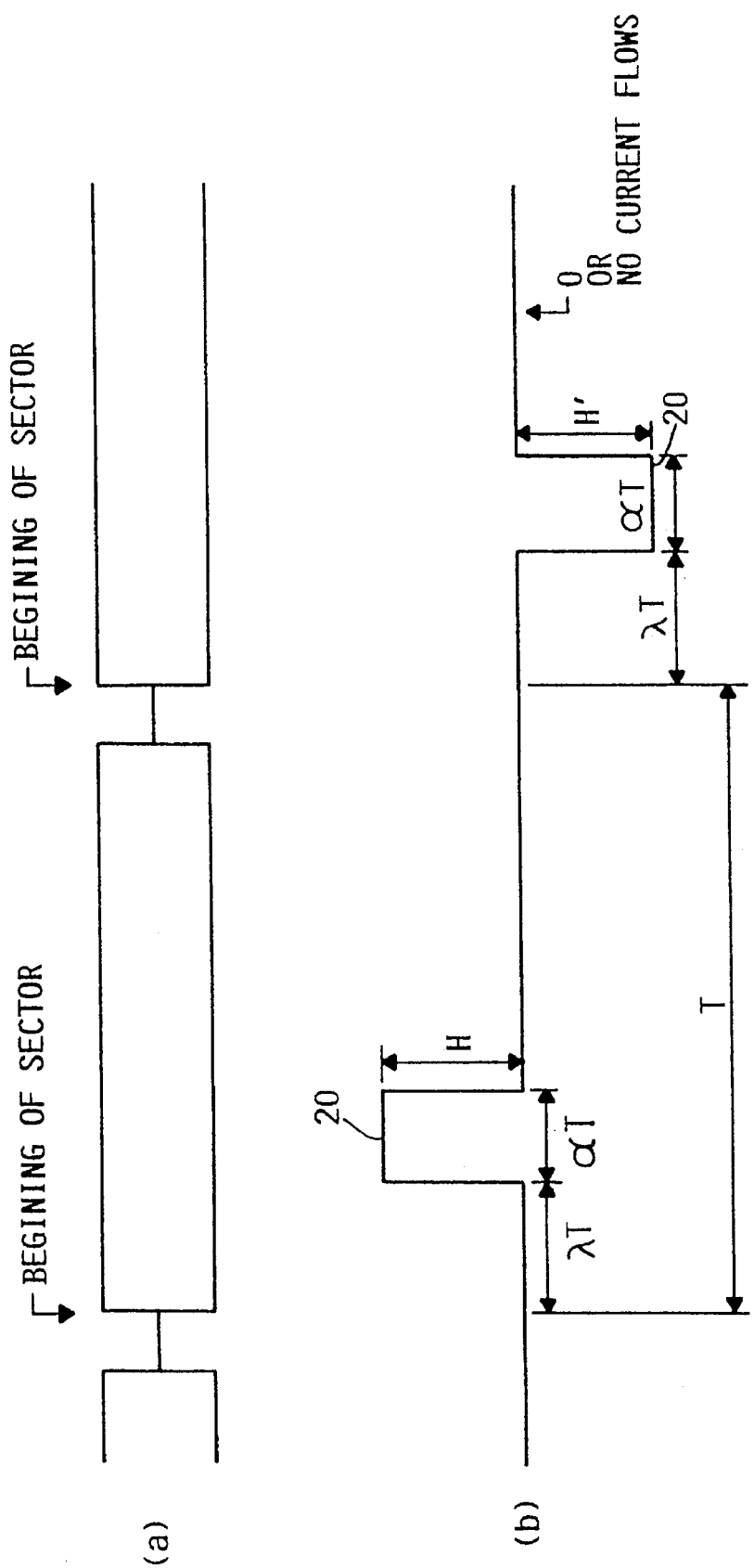
FIG. 3 is a timing chart showing the timing of a head signal and an output signal of a DAC 28 in the control of head positions.

Therefore, immediately after a time $\lambda T$ elapses since the beginning of the sector was detected, current to be provided to voice coil motor 22 is generated, and then immediately after a time $W=\alpha T$ elapses, current to be provided to voice coil motor 22 is shut off (FIG. 3(*b*)). Accordingly, the height H of manipulated pulse 20 converted digital to analog from DAC 28 is outputted to power amplifier 29, and manipulated pulse 20 is provided to voice coil motor 22 by power amplifier 29 according to a PAM-modulated signal. Further, T is the interval of time between the occurrences of corresponding sectors and PAM-modulated pulse 20 is generated at each sample cycle time T. In the following, it is described that the above method makes adaptive control possible.

If it is assumed that the position of voice coil motor 22 is p(t) at a time t, the velocity of head 23 is v(t), and the current passing through a voice coil of voice coil motor 22 is u(t), an equation of motion can be written as follows:

$$\dot{X}(t) = \begin{bmatrix} 0 & 1 \\ 0 & 0 \end{bmatrix} X(t) + \begin{bmatrix} 0 \\ K \end{bmatrix} u(t) \quad (4)$$

where, $X(t) = [p(t) v(t)]^t$
K=torque constant/inertia
It follows that $$= \mathbf{F} x(t) + G u(t)$$

where, $$\mathbf{F} X = \begin{bmatrix} 0 & 1 \\ 0 & 0 \end{bmatrix}, G = \begin{bmatrix} 0 \\ K \end{bmatrix}.$$

If a value is known at t=nT, the value X at t=nT+T is as follows:

$$X(nT+T) = e^{\mathbf{F}T} X(nT) + \int_{nT}^{nT+T} e^{\mathbf{F}(nT+T-\tau)} Gu(\tau) d\tau \quad (5)$$

Now, it is assumed that $\lambda$ shown in FIG. 3 as input is 0.
If current waveform is expressed by u(nT), then equation (5) can be written as follows:

$$X(nT+T) = e^{\mathbf{F}T} X(nT) + \int_{T-\alpha T}^{T} e^{\mathbf{F}T} d\tau Gu(nT)$$

It follows that $$X(nT+T) = \begin{bmatrix} 1 & T \\ 0 & 1 \end{bmatrix} X(nT) + \begin{bmatrix} K\frac{T^2}{2}(2\alpha-\alpha^2) \\ KT\alpha \end{bmatrix} u(nT) \quad (6)$$

Now, zero from input u(uT) to output p(uT) is calculated in this system as follows (see "Digital Control of Dynamics Systems" G. F. Franklin, J. D. Powell, Addison-Wesley, 1981, p.138):

$$\begin{vmatrix} z-1 & -T & -K\frac{T^2}{2}(2\alpha-\alpha^2) \\ 0 & z-1 & -KT\alpha \\ 1 & 0 & 0 \end{vmatrix} \quad (7)$$

$$= K\left\{ T^2\alpha + \frac{T^2}{2}(z-1)(2\alpha-\alpha^2) \right\}$$

$$= K\frac{T^2}{2}\{(2\alpha-\alpha^2)z + \alpha^2\} = 0$$

$$= K\frac{T^2}{2}\{\alpha(2-\alpha)z + \alpha^2\} = 0$$

From equation (7), z can be written as follows:

$$z = \frac{-\alpha}{2-\alpha} = 1 + \frac{2}{\alpha-2} \quad (8)$$

Figure 4:
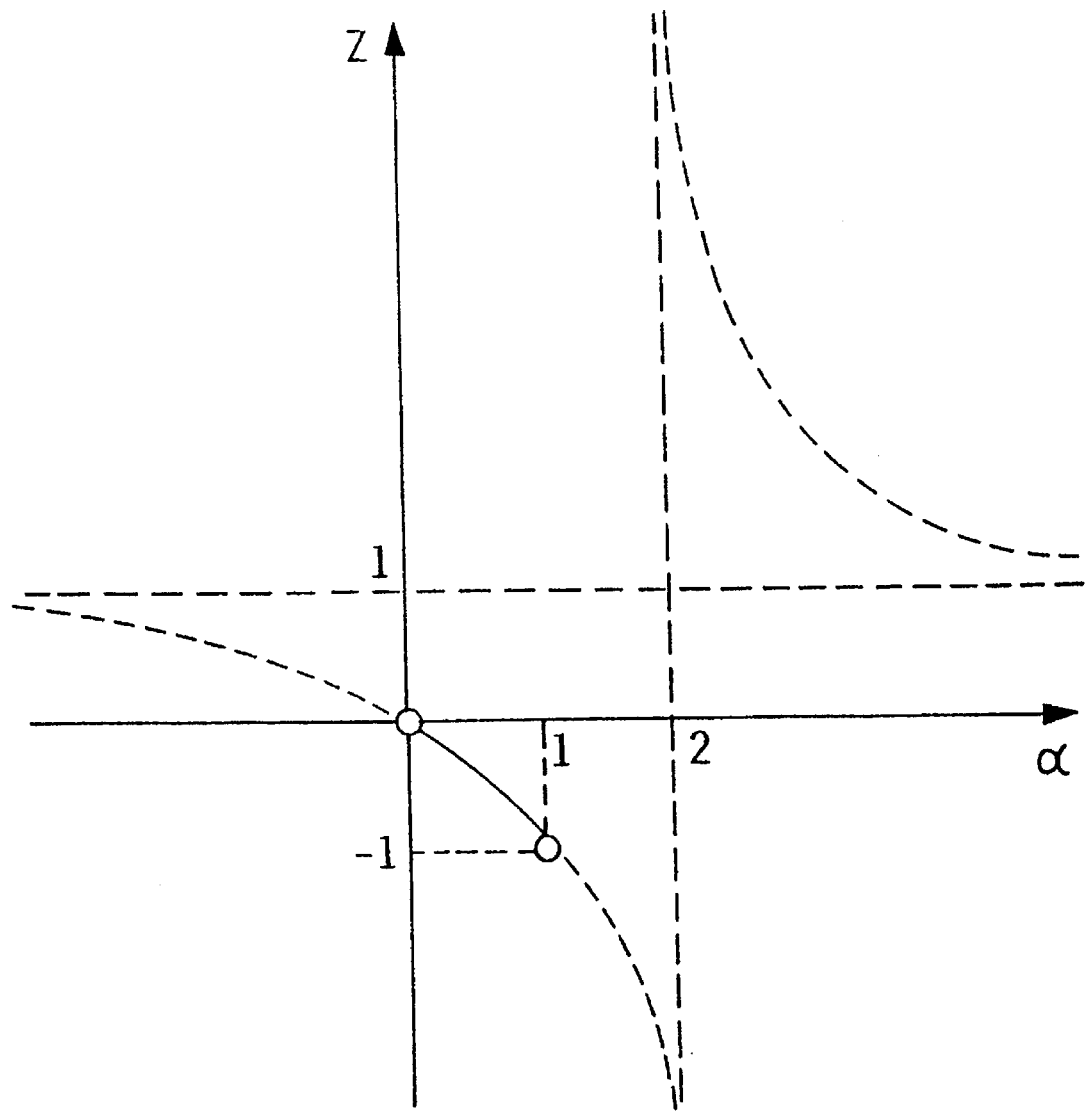
FIG. 4 is a graph showing the relationship between $\alpha$ and $z$.

The relation between $\alpha$ ($0<\alpha<1$) and z is shown in FIG. 4. As is obvious from FIG. 4, if $0<\alpha<1$, then $0<z<-1$, which means this system has zero within a unit circle. Therefore, in this system, which generates a manipulated pulse of a predetermined width $\alpha T$ which is PAM-modulated at each sample cycle time T, adaptive control becomes possible.

The same description is true for the case where $\lambda=0$, and therefore further description is omitted.

Figure 5:
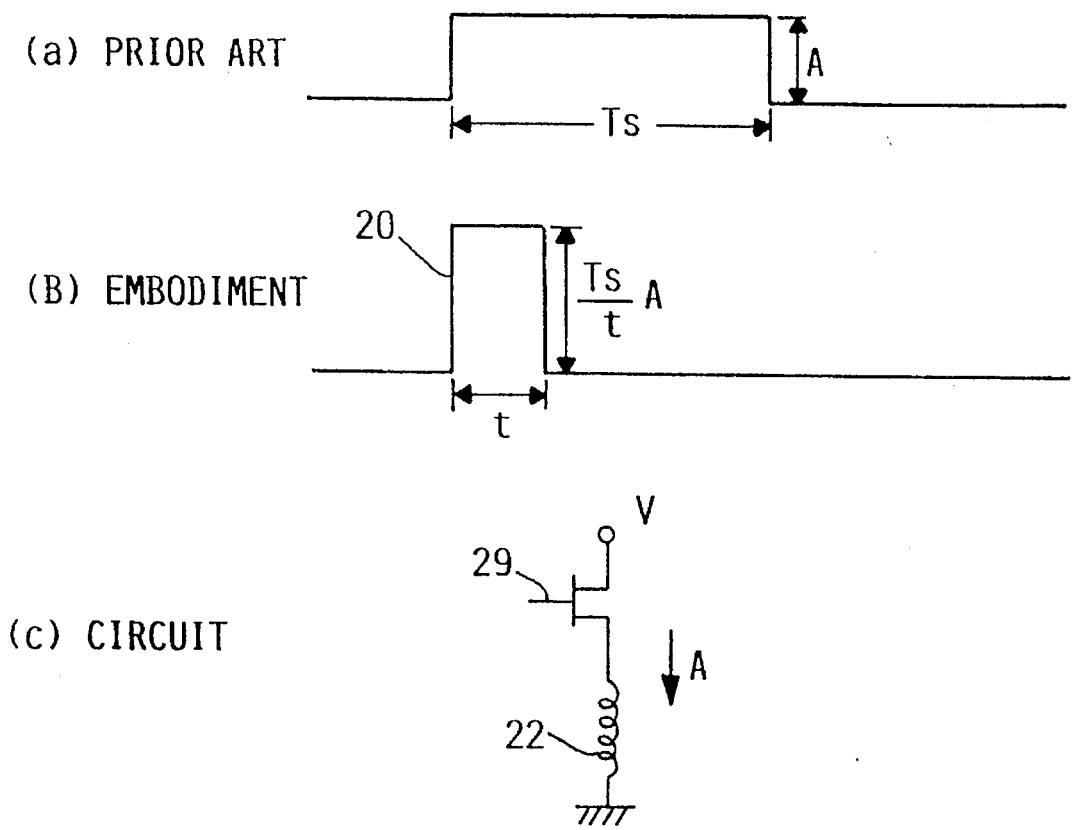
FIG. 5 is an explanatory drawing for describing how to calculate power consumption.

As shown in FIG. 5, in the case of a conventional example, that is, PWM control, power consumption for a voice coil motor and a power amplifier is as follows:

| Power consumption in the voice coil motor | $RA^2$ |
| Power consumption in the power amplifier | $(V-RA)A$ | where,
R: resistance of a voice coil
A: current that flows through the voice coil On the other hand, in the case of the embodiment, as shown in FIG. 5, if it is assumed that current flows through the voice coil only for a time $t/T_S$ differently from a conventional example, only $(T_S/t)A$ flows from 0 to t and no current flows for from t to $T_S$.

Average power consumption in the voice coil motor becomes:

$$(1/T_S)R(AT_S/t)^2 t = (T_S/t)RA^2$$

Average power consumption in the power amplifier becomes:

$$(1/T_S)(V-R(T_S/t)A)(T_S/t)At = VA - R(T_S/t)A^2$$

As is evident from the above, though the total power consumption VA in the voice coil motor and the power amplifier in the embodiment is the same as the conventional example, the power consumption in the power amplifier in the embodiment was reduced as compared with the conventional example.

(Power consumption in the power amplifier in the conventional example)-(power consumption in the power amplifier in this embodiment) can be expressed as follows:

$$(V-RA)A - \{VA - R(T_S/t)A^2\} = RA^2((T_S/t)-1)$$

Now, because $T_S > t$, it follows that:

$$RA^2((T_S/t)-1) > 0$$

As is obvious from the above, the power consumption in the power amplifier in the embodiment was reduced as compared with the power consumption in the power amplifier in the conventional example.

Now, if A=1(A), V=12(V), R=5($\Omega$), and $(T_S/t)=2$ are assumed as a numerical example, the power consumption in the power amplifier is 7 W in the conventional example while it is 2 W in the embodiment.

As described above, the total power consumption in the present invention is the same as in the prior art. However, in the present invention, the power consumption in the power amplifier decreased and the power consumption in the voice coil motor increased. Because the power amplifier is integrated circuits, the problem of calorification is more serious as compared with the relatively larger voice coil motor. The present invention is profitable to the selection of integrated circuits of the power amplifier.

Since in DAC 28 of the embodiment, current flows for the duration of the sample cycle during a seek operation and only for part of the sample cycle time during a track following operation, resolution can be changed so that, resolution decreases and a dynamic range becomes wide during the seek operation, and resolution increases and a dynamic range becomes narrow during the track following operation.

In the embodiment, an example of controlling head positions in a hard disk drive has been described. However, it will be appreciated that needless to say, the present invention can be applied also to the velocity control of a spindle motor.

As described above, according to the present invention, a controlled variable is detected at each predetermined sample timing, a deviation is calculated by comparing the controlled variable with a target value, a manipulated variable is calculated based on the deviation, and a manipulated pulse having a height corresponding to the manipulated variable and a predetermined width is provided to the controlled system, and thus as advantage that adaptive control becomes possible can be gained.

Although a variable width cannot be larger than the width of a sample cycle time T in the conventional pulse width modulation (PWM), there is not such a limit in the pulse amplitude modulation (PAM) according to the present invention. Therefore, the optimum control is always possible according to a variable parameter of a closed-loop system. That is, because there is not a theoretical limit in the variable width of pulse amplitude, the adaptive control becomes possible according to a variable parameter.

Further, according to the present invention, the position of the head is detected at each sampling of servo information, the detected position is compared with a predetermined position to obtain a deviation, a current value is calculated according to the deviation, and a manipulated pulse of a height corresponding to the current value and a predetermined width is outputted to a voice coil motor for driving the head, and thus advantages that not only power consumption is reduced, but also adaptive control is possible, can be gained.

What is claimed is:

1. A method for controlling a digital closed servo loop system of a disk drive, comprising the steps of:

providing a disk drive head;

providing a voice coil motor for driving the disk drive head;

providing a sample timing detecting circuit;

providing a position detecting circuit for receiving a head signal from the disk drive head and for detecting a head position at a time determined by the sample timing detecting circuit;

providing a microprocessor for calculating and generating a digital compensation value based on a calculated position error between the head position detected by the position detecting circuit and a desired target position;

providing a driving circuit used to generate an amplitude modulated pulse comprising:
   a power amplifier;
   a digital to analog converter, wherein the digital to analog convertor converts the digital compensation value from the microprocessor to an analog amplitude value for the amplitude modulated pulse as determined by the microprocessor;
   a power supply for controlling the width of the amplitude modulated pulse, the power supply being controlled by a pulse width generator, the amplitude modulated pulse having a width of a first value which is independent of the digital compensation value when the disk drive head is performing a seek operation, and the amplitude modulated pulse having a width of a second value which is independent of the digital compensation value that is less than the first value when the disk drive head is performing a track follow operation; and, supplying the amplitude modulated pulse from the driving circuit through the voice coil motor to drive the disk drive head.

2. The method of claim 1 wherein the first value is twice the second value.

3. An apparatus for controlling a disk drive head, the apparatus comprising:

a disk drive head;

a voice coil motor for driving the disk drive head;

a sample timing detecting circuit;

a position detecting circuit for receiving a head signal from the disk drive head and detecting a head position at a time determined by the sample timing detecting circuit;

a microprocessor for calculating and generating a digital compensation value based on a calculated position error between the head position detected by the position detecting circuit and a desired target position;

a driving circuit used to generate an amplitude modulated pulse comprising:
   a power amplifier;
   a digital to analog converter, wherein the digital to analog convertor converts the digital compensation value from the microprocessor to an analog amplitude value for the amplitude modulated pulse as determined by the microprocessor;
   a power supply for controlling the width of the amplitude modulated pulse, the power supply being controlled by a pulse width generator, the amplitude modulated pulse having a width of a first value which is independent of the digital compensation value when the disk drive head is performing a seek operation, and the amplitude modulated pulse having a width of a second value which is independent of the digital compensation value that is less than the first value when the disk drive head is performing a track following operation; and, wherein the amplitude modulated pulse from the driving circuit is coupled to the voice coil motor and is used to drive the disk drive head.

4. The apparatus of claim 3, wherein the first value is twice the second value.

* * * * *